Dec. 2, 1958 B. R. MASCOLO 2,862,323
FILM HOLDER
Filed Nov. 24, 1954
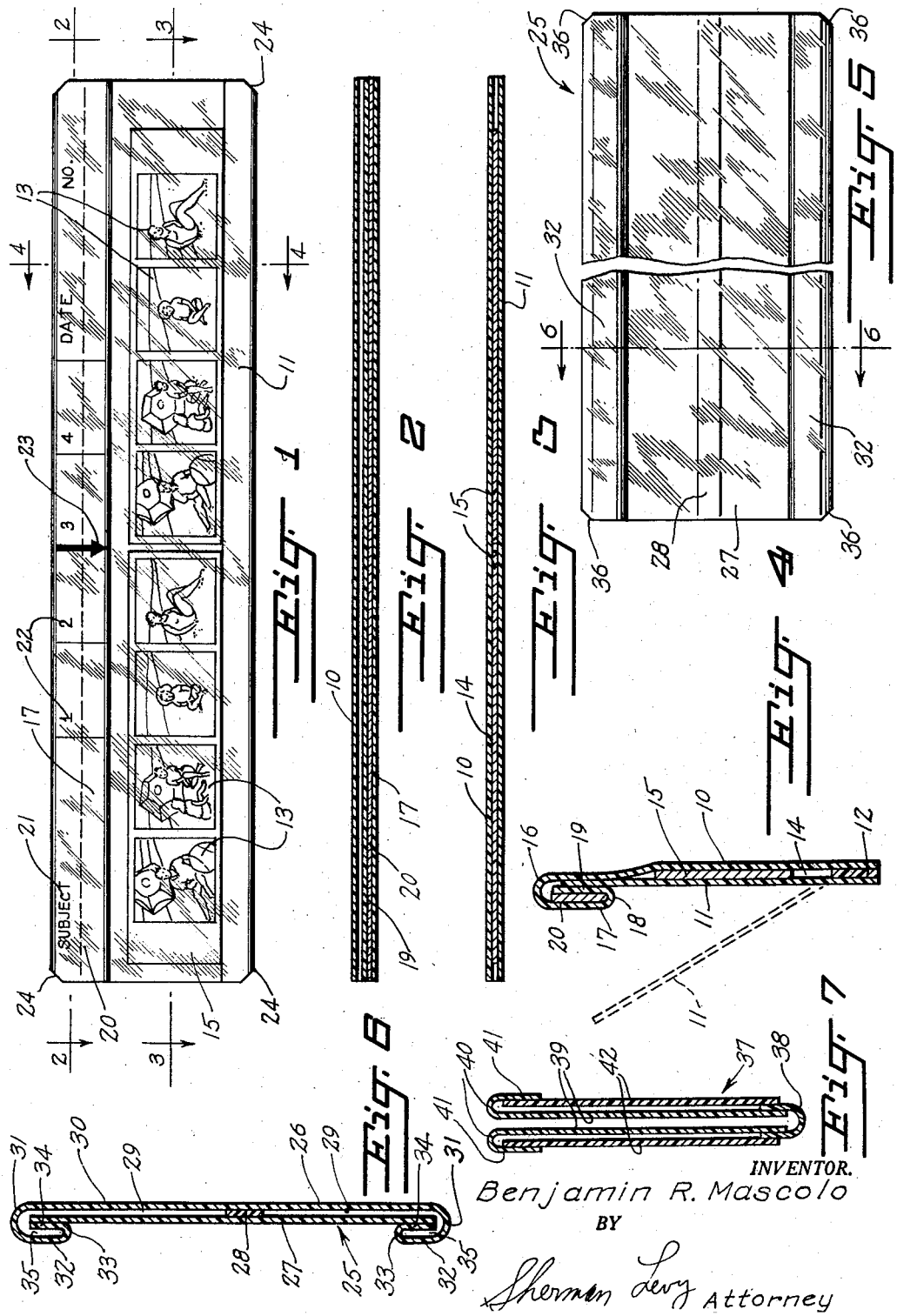
INVENTOR.
Benjamin R. Mascolo
BY
Sherman Levy Attorney

United States Patent Office 2,862,323
Patented Dec. 2, 1958

2,862,323

FILM HOLDER

Benjamin R. Mascolo, Jackson Heights, N. Y., assignor to American Kleer-Vu Plastics, Inc., Maspeth, N. Y.

Application November 24, 1954, Serial No. 470,857

1 Claim. (Cl. 40—159)

This invention relates to a holder, and more particularly to a device for holding film strips, slides and the like.

The object of the invention is to provide a film holder which is constructed so that flexible strips, slides and the like, can be readily inserted in the holder or removed therefrom without damage to the film, there being an indicating strip or card detachably mounted in the holder.

Another object of the invention is to provide a film holder which includes a pair of walls or members that are made of flexible transparent material such as plastic, and wherein one of the walls can be moved towards and away from the other wall so as to permit the insertion therebetween of a film strip which is to be viewed in a projector or other piece of apparatus, and wherein the film strip or slide will be retained within the holder and will not accidentally move therefrom, there being an indicating card or strip mounted in the holder which may have suitable indicia thereon which identifies the subject matter of the film strip.

A further object of the invention is to provide a film holder which can be used for three dimensional slides, microfilm, or any other type of film such as that which is viewed under enlargers or in three dimensional viewers, there being an index at the top of the holder which can be easily removed or inserted and wherein the film can be readily inserted in the holder, the holder having rounded corners so that the entire device can be readily inserted into a viewer or the like without the corners catching.

Another object of the invention is to provide a holder which will hold any type of film and wherein the film strip will not be damaged or scratched and wherein the film strip can be inserted or removed in a minimum of time and with a minimum amount of effort.

A further object of the invention is to provide a film holder which is extremely simple and inexpensive to manufacture.

Other objects and advantages will be apparent during the course of the following description.

In the accompanying drawings forming a part of this application, and in which like numerals are used to designate like parts throughout the same:

Figure 1 is a plan view showing the film holder of the present invention with the indicator card and film strip therein.

Figure 2 is a sectional view taken on the line 2—2 of Figure 1.

Figure 3 is a sectional view taken on the line 3—3 of Figure 1.

Figure 4 is a sectional view taken on the line 4—4 of Figure 1.

Figure 5 is a plan view of a modified film holder.

Figure 6 is a sectional view taken on the line 6—6 of Figure 5.

Figure 7 is a sectional view of a further modification.

Referring in detail to the drawings, there is shown a film holder which includes a first wall 10 that can be made of any suitable transparent material which is flexible such as a suitable plastic, and there is further provided a second wall 11 which is also made of a flexible transparent material. Interposed between the pair of walls 10 and 11 and arranged continuous to their lower edges and secured thereto in any suitable manner is a bonding strip 12. The walls 10 and 11 define a space 14 therebetween which snugly receives therein a film strip or slide 15 which is also flexible. The film strip 15 may have a plurality of exposures 13 thereon and as shown in Figure 1 two separate film strips 15 can be arranged in the space 14 in end to end relation with respect to each other as for example when the holder is being used in a three dimensional viewer.

The wall 11 is mounted for movement towards and away from the wall 10 so that the wall 11 can be moved from the solid line position of Figure 4 to the dotted line position so that the film strip 15 can be readily removed from or inserted in the space 14. Extending from the top of the wall 10 and secured thereto or formed integral therewith is a longitudinally extending web 16, and depending from the web 16 is a flange 17, the flange 17 being arranged in spaced parallel relation with respect to the adjacent portions of the walls 10 and 11. Extending inwardly from the lower longitudinal edge of the flange 17 is a lip 18, and projecting upwardly from the lip 18 is a flap 19, the flap 19 having the same length as the flange 17. As shown in Figure 4 the top of the wall 11 is spaced below the web 16. The flange 17, web 16, and flap 19 are all made of a flexible transparent material such as a suitable plastic, so that when the wall 11 is to be moved from the solid line position of Figure 4 to the dotted line position of Figure 4, the flange, lip and flap can be swung away from the upper free end portion of the wall 11 to permit the wall 11 to clear the flange and flap whereby clearance is provided to permit insertion and removal of the film strip 15.

The flange 17, lip 18, and flap 19 coact to define a space for detachably receiving an indicator card or index strip 20. The indicator card 20 may have suitable indicia thereon such as the word "Subject" which is indicated by the numeral 21 in Figure 1, and the member 20 may also have numerals as indicated by the number 22, and there may also be an arrow 23 to indicate the center of the holder. The ends or corners of the holder may be chamfered or rounded as at 24 so as to facilitate insertion of the holder into a viewing machine or the like.

From the foregoing, it is apparent that there has been provided a film holder which is especially suitable for holding slides, transparencies, film strips and the like. In use, when the article such as the film strips 15 are to be inserted in the holder, the indicator holder including the flap 19, lip 18 and flange 17 are manually moved away from the wall 11 and then the wall 11 is swung or pivoted from the solid line position shown in Figure 4 to the dotted line position of Figure 4. Thus, sufficient space is provided for the ready insertion of the film strips 15. When manual pressure on the wall 11 is released, it will move back to its superposed position with respect to the wall 10 due to its inherent resiliency. Also, the indicator card receiver is released so that it assumes the position shown in Figure 4 whereby the indicator card holder also serves to help lock or maintain the wall 11 against the wall 10 as shown in Figure 4. Thus the members 17, 18 and 19 serve a dual purpose, namely, to provide a holder for the indicator card 20, and also to retain the wall 11 against the wall 10 so as to prevent accidental displacement thereof.

As shown in Figure 1 two of the film strips 15 can be inserted in the space 14 in the holder and such film strips may be identical whereby when the holder is inserted in a suitable viewing machine or projector, a three dimensional effect can be produced. The card 20 may have suitable indicia thereon which will identify or describe the subject matter of the film strips.

In actual practice, the jacket or holder may be made of three members 10, 11 and 12 which can be made of a suitable plastic such as an acetate type of plastic. The walls 10 and 11 may be bonded or secured to the strip 12 and the wall 10 may be folded to form the portions 17, 18 and 19.

With previous jackets or film holders for use in the photographic field, the transparency or film strip had to be inserted from either or both of the ends of the holder, but much difficulty was encountered in inserting in this manner since friction prevented easy sliding of the transparency. Thus, the transparency was often damaged due to becoming wrinkled as the result of the difficult insertion. Also scratching resulted since it was necessary to force the transparency in whereby the surfaces came in contact with each other. Also insertion and removal of the transparencies was a time consuming operation, but with the present invention all of the aforementioned difficulties have been eliminated. Thus, the wall 11 is hingedly mounted as shown in Figure 4 so that the transparency 15 can be readily inserted and aligned very quickly. The holder can be used for three dimensional slides, microfilm, and any other type of film that is used in viewing under enlargers or for use in three dimensional viewers. The card or index 20 at the top of the holder is inserted very easily into its proper space and with the present invention the film can be readily inserted therein. Thus, by exerting only a slight amount of pressure, the flap 19 moves away from the wall 11 and then the wall 11 can be moved away from the wall 10 so that the film can be inserted, and the film is held in place under pressure. The rounded or chamfered corners 24 at the end of the holder permit the holder to be easily inserted into a viewer without having the corners catch accidentally. The holder can also be used for holding single as well as multiple transparencies, 35 mm. strips, and the like.

Since the walls 10 and 11 are transparent, the film strip 15 can be readily viewed through these walls. Also the members 17, 18 and 19 are transparent so that the indicia on the card 20 can be readily observed.

Referring to Figures 5 and 6 of the drawings there is shown a modified film holder which is indicated generally by the numeral 25. The film holder 25 includes a first wall 26 and a second wall 27, and a bonding strip 28 extends longitudinally between this pair of walls and is secured thereto in any suitable manner. The bonding strip 28 coacts with the wall 27 and with the central portion 30 of the first wall 26 whereby a pair of spaces 29 are defined between the walls for receiving therein film strips such as the film strips 15. Thus, the holder of Figures 5 and 6 provides a pair of spaces 29 so that twice as many film strips 15 can be supported therein as can be supported in the film holder shown in Figures 1–4.

Extending from each end of the wall 26 and secured thereto or formed integral therewith is an arcuate web 31, and extending inwardly from each web 31 is a flange 32 which terminates in an arcuate lip 33. A flap 34 extends from each lip 33, and the flap 34, lip 33, flange 32 and web 31 coact to define a space 35 in which may be snugly seated one of the cards 20. Since there are two of the spaces 35, a pair of the cards 20 can be supported in the film holder. The ends of the film holder may be chamfered as at 36 for the same purpose as the previously described chamfered ends 24.

In using the film holder 25 shown in Figures 5 and 6, the card holder or holders are manually swung away from the free ends of the second wall 27 whereby one or more film strips can be inserted in or removed from each of the spaces 29. After the film strips have been removed or replaced, manual pressure on the ends of the film strip 27 is released and pressure on the card holding portions of the holder are released so that the parts will assume the position shown in Figure 6 whereby the cards in the spaces 35 and film strips in the spaces 29 will be securely retained therein without any possibility of accidentally falling from the holder. The various parts can be made of plastic so that the user can readily observe the indicia on the cards and wherein the holders can be inserted in projecting equipment or viewing equipment so that the film strips can be projected or observed.

Although clear line envelopes have been made in the past, as well as folded envelopes, heretofore it has been impossible to make a combination of both. An important advantage of the present invention is that the envelope can be opened easily and film can be inserted and held in place by the clamping action of the transparent edges. Also, the film can be easily replaced. The parts 34, 33 and 32 not only hold the index card 20, but also serve to keep the film strip from falling out of the holder.

Referring to Figure 7 of the drawings there is shown a further modification wherein there is provided a holder which is indicated generally by the numeral 37. The holder 37 includes a flexible web 38 that has a first pair of walls 39 secured thereto in any suitable manner, as for example by means of an adhesive. Each of the walls 39 has its outer end shaped arcuately as at 40, and the arcuate portions 40 terminate in flaps 41 which serve to retain walls 42 in their proper position. The walls 42 may also be secured to the web 38 in any suitable manner, and various types of articles such as cards are adapted to be supported or retained between the walls 39 and 42. The walls 39 and 42 are preferably made of a transparent flexible plastic such as an acetate type of plastic. Thus, the user can readily observe indicia on the cards. To insert or remove the cards in the spaces between the walls, it is only necessary to manually lift up the flaps 41 whereby the wall 42 can be swung away from the walls 39 so that the cards and the like can be inserted between the walls, whereby the wall 42 can then be again moved adjacent to the wall 39 and then the flap 41 will retain these walls in their proper position.

The holder shown in Figure 7 is especially suitable for holding cards and the like and can be used in wallets. The flap 41 on the outside of the envelope or holder 37 opens in a hinge-like manner and the holder 37 can be manufactured simply and economically in an automatic operation. Heretofore such holders required the insertion or removal of cards through holes or openings in the holder, but with the device of Figure 7 it is only necessary to lift the flap 41 and then a card or cards can be easily inserted and then the flap holds the parts in their proper position. The web or hinge-like spacer 38 is preferably made of a flexible plastic.

I claim:

In a film holder, a first wall of transparent material, a second wall arranged in superposed relation with respect to said first wall and fabricated of flexible transparent material, a flat bonding strip interposed between the intermediate portions of said walls and secured thereto, said bonding strip being rectangular in cross section, said bonding strip being spaced centrally and inwardly from the longitudinal side edges of the first and second walls, the outer end portions of said second wall being mounted for movement towards and away from said first wall, said strip and walls defining a pair of spaces of the same size for receiving film strips therein, said spaces being arranged on opposite sides of the bonding strip, an arcuate web extending transversely from the longitudinal edge of each end of said first wall, said webs being of the same size, a flange arranged at right angles with respect to each of said webs and depending therefrom, said pair of flanges being of the same size, said pair of flanges being coplanar, an arcuate lip extending inwardly from the longitudinal edge of each flange, said lips being of the same size, said lips being arranged in spaced parallel relation with respect to each other, a flap extending from each lip, said flaps being of the same size, said flaps being coplanar, said flaps being arranged in spaced parallel relation with respect to said flanges, said flaps being arranged contiguous to the ends of said second wall, the ends of said second wall being spaced inwardly from said webs, the outer edges of said flaps being flush with the adjacent outer edge of said second wall, said flanges coacting with said lips and flaps to define a pair of spaces of the same size for receiving an indicating card, the corners of said holder being chamfered; said flanges, flaps and lips also serving to prevent the film strips from accidentally falling out of their proper spaces, said second wall having a tendency to normally occupy a position contiguous to said first wall due to the inherent resiliency of the parts.

References Cited in the file of this patent

UNITED STATES PATENTS

| | | |
|---|---|---|
| 1,294,948 | Rand | Feb. 18, 1919 |
| 2,089,333 | Bourdon | Aug. 10, 1937 |
| 2,411,368 | Dow | Nov. 19, 1946 |
| 2,508,854 | Brodsky | May 23, 1950 |
| 2,544,844 | Liber | Mar. 13, 1951 |
| 2,618,086 | Komorous | Nov. 18, 1952 |